(12) United States Patent
Ha et al.

(10) Patent No.: US 12,168,737 B2
(45) Date of Patent: Dec. 17, 2024

(54) MATTING AGENT INCLUDING POLYMER PARTICLES, MATTING POLYMER COMPOSITION INCLUDING MATTING AGENT, AND METHOD OF PRODUCING POLYMER PARTICLES

(71) Applicant: HANNANOTECH CO., LTD., Daejeon (KR)

(72) Inventors: Doo Han Ha, Yeosu-si (KR); Soo Wan Kim, Daejeon (KR); Sung Wook Ha, Yeosu-si (KR)

(73) Assignee: HANNANOTECH CO., LTD., Daejeon (KR)

( * ) Notice: Subject to any disclaimer, the term of this patent is extended or adjusted under 35 U.S.C. 154(b) by 0 days.

(21) Appl. No.: 17/823,437

(22) Filed: Aug. 30, 2022

(65) Prior Publication Data
US 2023/0073124 A1  Mar. 9, 2023

(30) Foreign Application Priority Data

Sep. 1, 2021 (KR) .......................... 10-2021-0116569

(51) Int. Cl.
| | |
|---|---|
| *C09D 7/42* | (2018.01) |
| *C08F 224/00* | (2006.01) |
| *C08F 279/04* | (2006.01) |
| *C08F 283/10* | (2006.01) |
| *C09D 155/02* | (2006.01) |
| *C08F 2/18* | (2006.01) |
| *C08F 222/20* | (2006.01) |
| *C09D 7/40* | (2018.01) |

(52) U.S. Cl.
CPC .............. *C09D 7/42* (2018.01); *C08F 224/00* (2013.01); *C08F 279/04* (2013.01); *C08F 283/105* (2013.01); *C09D 155/02* (2013.01); C08F 2/18 (2013.01); C08F 222/20 (2013.01); C08F 222/205 (2020.02); *C08F 283/10* (2013.01); C09D 7/69 (2018.01)

(58) Field of Classification Search
CPC ...... C09D 7/42; C08F 279/04; C08F 283/105; C08F 283/10; C08F 222/20; C08F 222/205; C08F 222/36; C08F 224/00
See application file for complete search history.

(56) References Cited

U.S. PATENT DOCUMENTS

| | | | | |
|---|---|---|---|---|
| 4,524,157 A | * | 6/1985 | Stamberger ........ | C08G 59/4284 528/80 |
| 5,025,060 A | * | 6/1991 | Yabuta .................. | C08F 290/04 524/556 |
| 5,061,754 A | | 10/1991 | Dufour et al. | |
| 5,580,924 A | | 12/1996 | Wildi et al. | |

FOREIGN PATENT DOCUMENTS

| | | |
|---|---|---|
| JP | S56112966 A | 9/1981 |
| JP | 2009500499 A | 1/2009 |
| KR | 930017975 A | 9/1993 |
| KR | 100321869 B1 | 8/2002 |
| KR | 20080025031 A | 3/2008 |
| KR | 20090081176 A | 7/2009 |
| KR | 20100019474 A | 2/2010 |
| KR | 20110066556 A | 6/2011 |
| KR | 20150125248 A | 11/2011 |

OTHER PUBLICATIONS

Korean Intellectual Property Office, Office Action Issued in Application No. 10-2021-0116569, Oct. 24, 2021, 15 pages.
Korean Intellectual Property Office, Notice of Allowance Issued in Application No. 10-2021-0116569, Feb. 15, 2022, 8 pages. (Submitted with Partial Translation).

* cited by examiner

*Primary Examiner* — Ling Siu Choi
*Assistant Examiner* — David L Miller
(74) *Attorney, Agent, or Firm* — McCoy Russell LLP

(57) ABSTRACT

The present disclosure relates to a matting agent including polymer particles, a matting polymer composition including a matting agent, and a method of producing polymer particles. The polymer particles may be produced by a simple process using a suspension polymerization method, and is relatively easy to control a degree of crosslinking. In addition, in a case where a matting polymer composition is prepared using a matting agent including the polymer particles, it is possible to manufacture a molded article having excellent appearance and matting effect without deterioration of the existing mechanical properties such as impact strength and tensile strength of a thermoplastic polymer, and in particular, an excellent matting effect may be exerted even in the extrusion processing, which has been difficult to achieve in the related art.

9 Claims, No Drawings

MATTING AGENT INCLUDING POLYMER PARTICLES, MATTING POLYMER COMPOSITION INCLUDING MATTING AGENT, AND METHOD OF PRODUCING POLYMER PARTICLES

CROSS-REFERENCE TO RELATED APPLICATION

The present application claims priority to Korean Patent Application No. 10-2021-0116569 filed on Sep. 1, 2021. The entire contents of the above-listed application are hereby incorporated by reference for all purposes.

TECHNICAL FIELD

The following disclosure relates to a matting agent including polymer particles, a matting polymer composition including a matting agent, and a method of producing polymer particles.

BACKGROUND

As electric vehicles become more common, in the vehicle industry, weight reduction issues are becoming more important, and various attempts have been made to achieve weight reduction. As typical examples, there have been attempts to remove a metal material, such as replacing a metal material of a vehicle body with light and high-strength engineering plastic, and fixing existing parts bonded by a combination of bolts and nuts with an adhesive.

In addition, the trend is changing from expression of various colors and textures by painting interior/exterior materials of vehicles to an increase in preference for products having a low-gloss or matte texture in accordance with weight reduction issues, environmental issues, the problem of driver's driving in reaction to light reflection on a painted surface, and the enhancement of interior design.

As a method of reducing gloss, a resin may be injected into a mold with a corrosive surface, but this does not exert a sufficient matting effect, and alternatively, an inorganic filler may be added, but a sufficient matting effect may be exerted when an excessive amount of the inorganic filler is used, and mechanical strength is insufficient when the inorganic filler is used in excess, and thus the use of the inorganic filler is significantly limited.

U.S. Patent Application Publication No. 5580924 discloses that a crosslinked styrene acrylonitrile (SAN) copolymer is produced by synthesizing a styrene-acrylonitrile copolymer and blending the styrene-acrylonitrile copolymer with 3,4-epoxycyclohexyl-3,4-epoxycyclohexyl carboxylate through a reaction extruder in order to reduce gloss of a bisphenol A polycarbonate (PC). However, the prior art is limited to manufacturing a molded article having excellent quality, because surface foreign substances such as black spots are generated during reaction extrusion, it is difficult to improve a color, difficulties in dissolution are caused due to the difficulty of controlling a crosslinking point, and appearance defects occur.

Therefore, research and development of a matting additive that has an excellent matting effect, prevents deterioration of mechanical properties, and may exhibit excellent quality appearance has been urgently demanded.

SUMMARY

An embodiment of the present disclosure is directed to providing polymer particles produced using suspension polymerization and a matting agent including the same.

Another embodiment of the present disclosure is directed to providing a matting polymer composition including the matting agent, and a molded article having an excellent matting effect, excellent mechanical properties, and excellent quality appearance by extrusion or injection-molding processing of the composition.

In order to solve the above problems, the present inventors produced polymer particles using a polymerizable composition including an aromatic vinyl compound, an unsaturated nitrile compound, and an alicyclic epoxy compound by a suspension polymerization method that has not been attempted in the related art. The present inventors have found that a degree of crosslinking may be relatively easily controlled by the polymer particles, and a matting agent and a matting polymer composition including the polymer particles may exert an excellent matting effect without deterioration of the existing physical properties of a thermoplastic polymer even with the addition of a small amount, and may manufacture a molded article having excellent quality appearance, thereby completing the present disclosure.

In one general aspect, a matting agent includes polymer particles, wherein the polymer particles are produced using a polymerizable composition including an aromatic vinyl compound, an unsaturated nitrile compound, and an alicyclic epoxy compound, an average particle size of the polymer particles is 1 to 5,000 μm, and an epoxy group of the alicyclic epoxy compound is ring-opened.

The polymer particles may be produced by suspension polymerization.

The alicyclic epoxy compound may have two or more epoxy groups, and the alicyclic epoxy compound may be one or more selected from the group consisting of 3,4-epoxycyclohexylmethyl 3,4-epoxycyclohexane-carboxylate, diethylene glycol bis(3,4-epoxycyclohexane-carboxylate), 2-ethyl-1,3-hexanediol bis(3,4-epoxycyclohexane-carboxylate), diethylene glycol bis(3,4-epoxy-6-methylcyclohexane-carboxylate), 3-methyl-1,5-pentanediol bis(3,4-epoxycyclohexane-carboxylate), 1,5-pentanediol bis(3,4-epoxycyclohexane-carboxylate), ethylene glycol bis(3,4-epoxycyclohexane-carboxylate), ethylene glycol bis(3,4-epoxy-6-methylcyclohexane-carboxylate), bis(3,4-epoxycyclohexylmethyl) oxalate, bis(3,4-epoxycyclohexylmethyl) succinate, bis(3,4-epoxycyclohexylmethyl) adipate, and 1,2,8,9-diepoxylimonene.

The polymerizable composition may include the unsaturated nitrile compound and the alicyclic epoxy compound in amounts of 20 to 45 parts by weight and 2.5 to 25 parts by weight, respectively, based on 100 parts by weight of the aromatic vinyl compound.

The polymerizable composition may further include one or two or more compounds selected from the group consisting of $R_1COOH$, $R_2SO_3H$, and salt compounds thereof, and $R_1$ and $R_2$ may be independently $C_{6-30}$ alkyl, $C_{6-30}$ aryl, or $C_{6-30}$ alkyl $C_{6-30}$ aryl.

The polymerizable composition may include the acid compound in an amount of 0.05 to 1 part by weight based on 100 parts by weight of the aromatic vinyl compound.

The polymer particles may include divalent —$SO_3$—.

In still another general aspect, there is provided a master batch chip including the matting agent.

In still another general aspect, a matting polymer composition includes the matting agent and a thermoplastic polymer.

The thermoplastic polymer may be one or more selected from the group consisting of polypropylene (PP), polyacrylate, polyethylene terephthalate (PET), polybutylene terephthalate (PBT), polymethyl methacrylate (PMMA), polycarbonate (PC), polyamide, a styrene-acrylonitrile (SAN) copolymer, acrylonitrile-butadiene-styrene (ABS), acrylonitrile-styrene-acrylate (ASA), and a mixture thereof.

In still another general aspect, there is provided a molded article manufactured by extruding or injection-molding the matting polymer composition.

In still another general aspect, a method of producing polymer particles includes: dispersing a polymerizable composition including an aromatic vinyl compound, an unsaturated nitrile compound, and an alicyclic epoxy compound in an aqueous solution including a suspension stabilizer; and performing suspension polymerization of the dispersed polymerizable composition.

In the method of producing polymer particles, the polymerizable composition may include the unsaturated nitrile compound and the alicyclic epoxy compound in amounts of 20 to 45 parts by weight and 2.5 to 25 parts by weight, respectively, based on 100 parts by weight of the aromatic vinyl compound.

In the method of producing polymer particles, the polymerizable composition may further include one or two or more compounds selected from the group consisting of $R_1COOH$, $R_2SO_3H$, and salt compounds thereof, and $R_1$ and $R_2$ may be independently $C_{6-30}$ alkyl, $C_{6-30}$ aryl, or $C_{6-30}$ alkyl $C_{6-30}$ aryl.

In the method of producing polymer particles, the polymerizable composition may include the acid compound in an amount of 0.05 to 1 part by weight based on 100 parts by weight of the aromatic vinyl compound.

Other features and aspects will be apparent from the following detailed description, the drawings, and the claims.

DETAILED DESCRIPTION

Hereinafter, the present disclosure will be described in more detail with reference to specific exemplary embodiments or exemplary embodiments including the accompanying drawings. However, each of the following specific exemplary embodiments or exemplary embodiments is merely one reference example for describing the present disclosure in detail, and the present disclosure is not limited thereto and may be implemented in various forms.

In addition, unless otherwise defined, all the technical terms and scientific terms have the same meanings as commonly understood by those skilled in the art to which the present disclosure pertains. The terms used in the description of the present disclosure are merely used to effectively describe a specific exemplary embodiment, but are not intended to limit the present disclosure.

In addition, unless the context clearly indicates otherwise, the singular forms used in the specification and the scope of the appended claims are intended to include the plural forms.

In addition, unless explicitly described to the contrary, "comprising" any components will be understood to imply further inclusion of other components rather than the exclusion of any other components.

The term "matting" in the present specification refers to a property of reducing gloss by a diffuse reflection effect through differences in shrinkage and refractive index between polymers and between a polymer and an additive in an incompatible polymer composition or surface processing.

The term "dispersed phase" in the present specification may refer to a discontinuous phase distributed throughout a dispersion medium, and specifically, may refer to a discontinuous phase in which a polymerizable composition is distributed in the form of a droplet using water as a medium.

Hereinafter, exemplary embodiments and methods of measuring physical properties of a matting agent including polymer particles, a matting polymer composition including a matting agent, and a method of producing polymer particles of the present disclosure will be described in detail.

The present disclosure may be better understood by the following exemplary embodiments, and the following exemplary embodiments are not intended to describe purposes of the present disclosure and are not intended to limit the scope of protection limited by the appended claims.

Hereinafter, an exemplary embodiment of the present disclosure will be described in detail.

The present disclosure provides a matting agent including polymer particles, wherein the polymer particles are produced using a polymerizable composition including an aromatic vinyl compound, an unsaturated nitrile compound, and an alicyclic epoxy compound, an average particle size of the polymer particles is 1 to 5,000 μm, and an epoxy group of the alicyclic epoxy compound is ring-opened.

The average particle size of the polymer particles may be referred to as D50, and D50 refers to a particle size when a cumulative volume from a small particle size accounts for 50% in measuring a particle size distribution by a laser scattering method. In this case, as for D50, the particle size distribution may be measured by collecting the polymer particles according to KS A ISO 13320-1 standard using Mastersizer 3000 manufactured by Malvern Panalytical Ltd. Specifically, water may be used as a dispersion medium, and if necessary, the water is dispersed using an ultrasonic disperser, and then, a volume density may be measured, but the present disclosure is not limited thereto. In order to measure the average particle size, a commonly used or known method may be used.

Specifically, the average particle size of the polymer particles may be 1 to 5,000 μm, 5 to 2,000 μm, or 10 to 1,500 μm, or 50 to 1,000 μm. The polymer particles having an average particle size within the above range may exert an excellent matting effect without deterioration of other physical properties even with the addition of a small amount. In addition, the polymer particles may have a substantially spherical shape, and a molded article having excellent appearance quality may be manufactured using the polymer particles.

The epoxy group of the alicyclic epoxy compound included in the polymer particles may be in a ring-opened state, and specifically, the ring-opened epoxy group may be ring-opened by reacting with other compounds included in the polymerizable composition. More specifically, the alicyclic epoxy compound may be included in the polymer particles by chemically bonding with a polymer, but is not limited thereto.

According to an exemplary embodiment of the present disclosure, the polymer particles may be produced by suspension polymerization. In order to solve the problems that occurred in the related art, suspension polymer particles may be produced using suspension polymerization. In a case where the suspension polymer particles are used, a degree of crosslinking may be easily controlled, such that a molded article having excellent appearance quality may be manufactured, and an excellent matting effect may be exerted even with the addition of a small amount.

According to an exemplary embodiment of the present disclosure, as a non-limiting example, the aromatic vinyl compound may be one or more selected from the group consisting of styrene, α-methyl styrene, o-methyl styrene, p-methyl styrene, m-methyl styrene, ethyl styrene, isobutyl styrene, t-butyl styrene, o-bromo styrene, p-bromo styrene, m-bromo styrene, o-chloro styrene, p-chloro styrene, m-chloro styrene, vinyltoluene, vinylxylene, fluorostyrene, and vinylnaphthalene, and styrene may be used.

As a non-limiting example, the unsaturated nitrile compound may be one or more selected from the group consisting of acrylonitrile, methacrylonitrile, ethacrylonitrile, phenylacrylonitrile, and α-chloroacrylonitrile, and acrylonitrile may be used.

The alicyclic epoxy compound may have two or more epoxy groups, specifically, the alicyclic epoxy compound may be one or more selected from the group consisting of 3,4-epoxycyclohexylmethyl 3,4-epoxycyclohexane-carboxylate, diethylene glycol bis(3,4-epoxycyclohexane-carboxylate), 2-ethyl-1,3-hexanediol bis(3,4-epoxycyclohexane-carboxylate), diethylene glycol bis(3,4-epoxy-6-methylcyclohexane-carboxylate), 3-methyl-1,5-pentanediol bis(3,4-epoxycyclohexane-carboxylate), 1,5-pentanediol bis(3,4-epoxycyclohexane-carboxylate), ethylene glycol bis(3,4-epoxycyclohexane-carboxylate), ethylene glycol bis(3,4-epoxy-6-methylcyclohexane-carboxylate), bis(3,4-epoxycyclohexylmethyl) oxalate, bis(3,4-epoxycyclohexylmethyl) succinate, bis(3,4-epoxycyclohexylmethyl) adipate, and 1,2,8,9-diepoxylimonene, and 3,4-epoxycyclohexylmethyl 3,4-epoxycyclohexane-carboxylate may be used. As another example, commercially available products such as CEL-2021, CEL-3000, and CEL-2081 manufactured by Daicel Chemical Industries, Ltd., and the like may be used.

According to an exemplary embodiment of the present disclosure, the polymerizable composition may include the unsaturated nitrile compound in an amount of 1 to 90 parts by weight, or 10 to 70 parts by weight, or 20 to 45 parts by weight, based on 100 parts by weight of the aromatic vinyl compound, and the polymerizable composition may include the alicyclic epoxy compound in an amount of 0.1 to 50 parts by weight, or 1 to 40 parts by weight, or 2.5 to 25 parts by weight or 5 to 20 parts by weight, based on 100 parts by weight of the aromatic vinyl compound. When the above ranges are satisfied, the reaction stability may be maintained, polymer particles having physical properties desired in the present disclosure may be produced and a matting effect may be effectively exerted even by adding a small amount of the matting agent including the polymer particles.

In addition, the aromatic vinyl compound may be included in an amount of 50 to 90 wt % or 65 to 80 wt %, based on the total weight of the polymerizable composition, and the unsaturated nitrile compound may be included in an amount of 10 to 50 wt % or 20 to 35 wt %, based on the total weight of the polymerizable composition. When the above ranges are satisfied, a matting effect may be more effectively exerted, a yellowing phenomenon may be suppressed, and a color realization performance may be improved, but the present disclosure is not limited thereto as long as physical properties desired in the present disclosure are not impaired.

According to an exemplary embodiment of the present disclosure, the polymerizable composition may further include one or two or more compounds selected from the group consisting of $R_1COOH$, $R_2SO_3H$, and salt compounds thereof, and R and $R_2$ may be independently $C_{6-30}$ alkyl, $C_{6-30}$ aryl, or $C_{6-30}$ alkyl $C_{6-30}$ aryl. In addition, the salt compound of the acid compound may be represented by $R_1COOM$ or $R_2SO_3M$, $R_1$ and $R_2$ may be the same as described above, and M may be a cation. M may be an alkali metal cation or an ammonium cation, and as a non-limiting example, M may be one or more selected from the group consisting of a sodium ion, a potassium ion, and a lithium ion, but is not limited thereto.

The acid compound may be $R_2SO_3H$, and $R_2$ may be $C_{6-12}$ alkyl $C_{6-18}$ aryl, and as an example, the acid compound may be selected from butylbenzenesulfonic acid, octylbenzenesulfonic acid, dodecylbenzenesulfonic acid, and pentadecylbenzenesulfonic acid, but is not limited thereto. The acid compound may be included in an amount of 0.005 to 5 parts by weight or 0.05 to 1 part by weight, based on 100 parts by weight of the aromatic vinyl compound of the polymerizable composition.

In addition, the polymer particles may include divalent —$SO_3$— or —$CO_3$— substituents, specifically, —$SO_3$— substituents. The divalent substituents may be formed by reacting the acid compound included in the polymerizable composition with the alicyclic epoxy compound included in the polymerizable composition, and each of the divalent substituents may be bonded to a hydrocarbyl group. The divalent substituents may be included by being bonded to a polymer chain. In addition, the divalent substituents may be mainly present on a surface of the polymer particle, and may have a concentration gradient in which a concentration of the divalent substituents is decreased in a direction from the surface of the polymer particle to the inside of the polymer particle. The concentration gradient may be derived from a suspension polymerization mechanism. Specifically, as the acid compound is positioned at an interface of the dispersed phase, the divalent substituents may be present in a high concentration on the surface of the polymer particle through a reaction between the acid compound positioned at the interface and the alicyclic epoxy compound at the interface. The polymer particles having the above structure may exert a significant matting effect.

Specifically, the polymerizable composition may be mixed with water (medium) to form a dispersed phase, and the acid compound or the salt compound thereof may be positioned at an interface between the dispersed phase and an aqueous phase so that the polymerizable composition is polymerized. In a case where suspension polymerization is performed by further adding the acid compound to the polymerizable composition, the reactivity may be effectively improved, and polymer particles having a rigid crosslinked network may be produced.

The present disclosure may provide a matting agent including the polymer particles. After completion of the suspension polymerization, the polymer particles may be obtained in the form of beads, and may be dehydrated and dried to be used as a matting agent.

The present disclosure may provide a master batch chip including the matting agent. The master batch chip may include a thermoplastic polymer and a matting agent, and may further include one or two or more additives selected from the group consisting of an antioxidant, a UV absorber, a UV stabilizer, a lubricant, and a mixture thereof. The additive may be used without limitation as long as it is commonly used or known. The matting agent may be included in an amount of 0.1 to 50 wt % or 5 to 30 wt %, based on the total weight of the master batch chip. When the mater batch chip in the above range is used, dispersibility and uniformity of contents of the matting agent and the additive are improved, such that a high-quality product (molded article) may be manufactured.

The present disclosure may provide a matting polymer composition including the matting agent and a thermoplastic polymer. The matting agent may effectively exhibit the matting properties without deterioration of the existing physical properties of a thermoplastic polymer even with the addition of a small amount, and has a dense degree of crosslinking and thus has excellent dispersibility with the thermoplastic polymer. The problems of the related art may be solved using the matting agent, and a low-gloss and matte product having excellent mechanical strength may be manufactured by extrusion or injection-molding processing of the matting polymer composition.

According to an exemplary embodiment of the present disclosure, the thermoplastic polymer may be one or more selected from the group consisting of polypropylene (PP), polyacrylate, polyethylene terephthalate (PET), polybutylene terephthalate (PBT), polymethyl methacrylate (PMMA), polycarbonate (PC), polyamide, a styrene-acrylonitrile (SAN) copolymer, acrylonitrile-butadiene-styrene (ABS), acrylonitrile-styrene-acrylate (ASA), and a mixture thereof. Specifically, a mixture of PC and SAN, a mixture of PC and ABS, or a mixture of PC and ASA may be used, but the present disclosure is not limited thereto.

According to an exemplary embodiment of the present disclosure, the matting agent and the thermoplastic polymer may be included in the matting polymer composition in amounts of 0.1 to 30 wt % and 70 to 99.9 wt %, respectively, but are not limited thereto, and the amount of the matting agent added may be adjusted depending on surface gloss of a product to be manufactured.

According to an exemplary embodiment of the present disclosure, the matting polymer composition may further include an additive commonly used in the related art depending on the purpose and use. For example, the matting polymer composition may further include an antioxidant, a UV absorber, a UV stabilizer, a lubricant, and the like. In this case, the additives may be included in an appropriate amount within a range in which the physical properties desired in the present disclosure are not impaired.

According to an exemplary embodiment of the present disclosure, the matting agent may be produced into a master batch chip including a thermoplastic polymer, and then may be mixed with a thermoplastic polymer again, and the master batch chip may further include an additive. The master batch chip may be included in an amount of 0.1 to 50 wt % or 1 to 30 wt %, based on the total weight of the matting polymer composition, a content of the matting agent in a product to be finally manufactured may be determined by adjusting the amount of the mater batch chip added.

The present disclosure may provide a molded article manufactured by extruding or injection-molding the matting polymer composition. It was very difficult to manufacture a molded article having an excellent matting effect in extrusion processing in the related art. However, the matting polymer composition of the present disclosure to which the matting agent including the polymer particles is applied may not only effectively suppress appearance defects due to particle protrusion in extrusion processing, but also may produce a molded article having excellent matting properties and excellent quality appearance without impairing the existing mechanical properties of a polymer.

Hereinafter, a method of producing polymer particles according to the present disclosure will be described in detail.

The present disclosure may provide a method of producing polymer particles, the method including: dispersing a polymerizable composition including an aromatic vinyl compound, an unsaturated nitrile compound, and an alicyclic epoxy compound in an aqueous solution including a suspension stabilizer; and performing suspension polymerization of the dispersed polymerizable composition.

The suspension polymerization may be performed without limitation by a known or commonly used method as long as the polymer particles desired in the present disclosure may be produced. In addition, specific descriptions of the polymerizable composition, and specific examples and contents of the aromatic vinyl compound, the unsaturated nitrile compound, and the alicyclic epoxy compound are the same as described above.

According to an exemplary embodiment of the present disclosure, in the method of producing polymer particles, the polymerizable composition may further include one or two or more acid compounds selected from the group consisting of $R_1COOH$, $R_2SO_3H$, and salt compounds thereof, and detailed descriptions and specific examples of the acid compound are the same as described above.

In addition, the polymerizable composition may further include a crosslinking agent. The crosslinking agent may be used without great limitation as long as the number of crosslinkable functional groups is two or more, and detailed description and specific examples of the crosslinking agent are the same as described above.

In addition, the polymerizable composition may further include a molecular weight modifier to control the molecular weight. As the molecular weight modifier, n-dodecyl mercaptan, n-amyl mercaptan, t-butyl mercaptan, t-dodecyl mercaptan, n-hexyl mercaptan, n-octyl mercaptan, n-nonyl mercaptan, and the like may be used, and the molecular weight modifier may be used in an amount of 0.001 to 10 parts by weight and 0.01 to 5 parts by weight, based on 100 parts by weight of the aromatic vinyl compound, but is not limited thereto.

According to an exemplary embodiment of the present disclosure, in the dispersing of the polymerizable composition in the aqueous solution including the suspension stabilizer, which is a step of adding a polymerizable composition, an acid compound, and an initiator to an aqueous solution obtained by dissolving a suspension stabilizer in deionized water and performing stirring and dispersion at room temperature to prepare a polymerizable suspension, it is possible to perform the dispersion with a sufficient time and stirring speed, and the reaction stability may be more excellent as the dispersibility of the polymerizable suspension is more stable. Therefore, the time and stirring speed are not greatly limited, but for example, when a reactor with a capacity of 2 L is used, for example, the stirring is performed at a stirring speed of 200 rpm or more for a stirring time of 10 minutes or longer. In this case, the polymerizable suspension may further include a commonly used or known suspension stabilization aid, buffer (pH adjuster), molecular weight modifier, and the like.

In addition, in the dispersion, the polymerizable composition forms a dispersed phase using deionized water (aqueous phase) as a medium, and sufficient stirring may be performed so that droplets of the dispersed phase are uniformly spread. In addition, the suspension stabilizer and the acid compound or the salt compound thereof may be positioned at an interface between the aqueous phase and the dispersed phase, the initiator in the dispersed phase may be initiated depending on external temperature conditions, and polymerization of the polymerizable composition may be performed inside the dispersed phase and the corresponding interface.

In the performing of the suspension polymerization of the dispersed polymerizable composition, which is a step of increasing an internal temperature of the reactor to 50 to 70° C. and then initiating the reaction, as the reaction proceeds, an exothermic reaction may occur, and it is possible to constantly maintain the temperature of the reactor at 65 to 75° C. using a cooler. The reaction time may be 1 to 5 hours. In addition, in the suspension polymerization, additional polymerization may be performed once or two times or more, and the suspension polymerization may be performed by performing additional polymerization at 60° C. to 75° C. for 30 minutes to 5 hours, and then performing additional polymerization at 80° C. to 95° C. for 30 minutes to 6 hours, but is not limited thereto.

In addition, after completion of the reaction, it is possible to obtain white powdery polymer particles having a moisture content of 0.5 wt % or less through dehydration and drying processes. A specific description of the produced polymer particles is the same as described above.

The suspension stabilizer lowers an interfacial energy between the polymerizable composition as a dispersed phase and the aqueous phase as deionized water, such that a more uniform dispersed phase is maintained, which may implement preparation of a stable polymerizable suspension. Therefore, the suspension polymerization may be stably performed. The suspension stabilizer is not greatly limited as long as polymer particles desired in the present disclosure may be produced.

Both organic and inorganic suspension stabilizers may be used as the suspension stabilizer. Non-limiting examples of the suspension stabilizer include an organic suspension stabilizer such as a homopolymer or copolymer of acrylic acid or methacrylic acid, polyalkylacrylate-(meth)acrylic acid (polyethylacrylate-acrylic acid, polyethylacrylate-methacrylic acid, polyethylhexylacrylate-acrylic acid, or the like), polyolefin-maleic acid, polyvinyl alcohol, or cellulose; an inorganic suspension stabilizer such as tricalcium phosphate; and a mixture thereof, but are not limited thereto. The (meth)acrylic acid may be in the form of a salt of sodium, potassium, or ammonium. In addition, the suspension stabilizer may be included in an amount of 0.01 to 3 parts by weight or 0.05 to 0.5 parts by weight, based on 100 parts by weight of the polymerizable composition, but is not limited thereto.

Disodium hydrogen phosphate and sodium dihydrogen phosphate may be used as the suspension stabilization aid, and sodium sulfate and the like may be added to control solubility characteristics of water-soluble polymers or monomers, but the present disclosure is not limited thereto.

A description and specific examples of the acid compound are the same as described above.

In addition, a weight ratio of the alicyclic epoxy compound to the acid compound in the polymerizable composition may be 1:0.001 to 0.5, 1:0.005 to 0.2, or 1:0.01 to 0.1. When the above range is satisfied, the reaction stability may be maintained, the polymer particles may be produced into a substantially spherical shape. When a matting agent including the suspension polymer particles is used, a molded article having an improved matting effect and appearance quality may be manufactured without deterioration of mechanical properties even with the addition of a small amount.

According to an exemplary embodiment of the present disclosure, the initiator may be an oil-soluble initiator dissolved in the polymerizable composition, and may be used without particular limitation as long as it is an initiator commonly used in suspension polymerization. For example, the initiator may be a radical polymerization initiator, and as a non-limiting example, octanoyl peroxide, decanoyl peroxide, lauroyl peroxide, benzoyl peroxide, monochlorobenzoyl peroxide, dichlorobenzoyl peroxide, p-methylbenzoyl peroxide, tert-butyl perbenzoate, azobisisobutylonitrile, azobis-(2,4-dimethyl)-valeronitrile, and the like may be used, but the present disclosure is not limited thereto. The suspension stabilizer may be included in an amount of 0.01 to 5 parts by weight or 0.05 to 0.5 parts by weight, based on 100 parts by weight of the polymerizable composition, but is not limited thereto.

Hereinafter, the present disclosure will be described in more detail with reference to Examples and Comparative Examples. However, the following Examples and Comparative Examples are only examples for describing the present disclosure in more detail, and the present disclosure is not limited by the following Examples and Comparative Examples.

Physical Property Measurement Methods

1) Average particle size: An average particle size was measured using a particle size analyzer (Mastersizer 3000, manufactured by manufactured by Malvern Panalytical Ltd.).

2) Surface gloss: Surface gloss was measured at 60° and 85° according to ASTM D523.

3) Notched IZOD impact strength: Impact strength was measured at ¼" and ⅛" according to ASTM D256.

4) Tensile strength: Tensile strength was measured according to ASTM D638.

Production of Polymer Particles

Example 1

150 g of deionized water and 2.0 g of tricalcium phosphate were added to a reactor and the mixture was stirred and dissolved. Thereafter, a polymerizable composition including 65 g of styrene, 26 g of acrylonitrile, 9 g of 3,4-epoxycyclohexylmethyl-3,4-epoxycyclohexyl carboxylate, 0.25 g of dodecylbenzenesulfonic acid, and 0.15 g of azobisisobutylonitrile was added to a reactor, and the mixture was stirred at a stirring speed of 500 rpm or more for 30 minutes or longer. After confirming the dispersion stability of the suspension, suspension polymerization was performed for 3 hours while raising the temperature to 65° C. and stirring the mixture in a nitrogen atmosphere. Thereafter, the temperature was raised to 70° C. for 1 hour, the reaction was performed again for 3 hours, the temperature was raised to 92° C. for 1 hour, the reaction was performed for 4 hours, and then the suspension polymerization was completed. After completion of the reaction, washing, dehydration, and drying processes were performed, and then white powdery polymer particles according to Example 1 were finally obtained. The polymer particles were obtained in the form of beads, and the measured average particle size of the particles was 220 μm.

Example 2

The same procedure as that of Example 1 was performed, except that 5 g of 3,4-epoxycyclohexylmethyl-3,4-epoxycyclohexyl carboxylate was added. The measured average particle size of the polymer bead particles was 250 μm.

Example 3

The same procedure as that of Example 1 was performed, except that 12 g of 3,4-epoxycyclohexylmethyl-3,4-epoxycyclohexyl carboxylate was added. The measured average particle size of the polymer bead particles was 170 μm.

Example 4

The same procedure as that of Example 1 was performed, except that polyethylacrylate-methylacrylic acid was used instead of tricalcium phosphate as a suspension stabilizer. The measured average particle size of the polymer bead particles was 190 μm.

Example 5

The same procedure as that of Example 1 was performed, except that 86 g of styrene and 14 g of acrylonitrile were added in the preparation of the polymerizable composition. The measured average particle size of the polymer bead particles was 210 μm.

Example 6

The same procedure as that of Example 5 was performed, except that 2 g of 3,4-epoxycyclohexylmethyl-3,4-epoxycyclohexyl carboxylate was added in the preparation of the polymerizable composition. The measured average particle size of the polymer bead particles was 270 μm.

Comparative Example 1

The same procedure as that of Example 1 was performed, except that dodecylbenzenesulfonic acid was not added and the same amount of divinylbenzene was added instead of 3,4-epoxycyclohexylmethyl-3,4-epoxycyclohexyl carboxylate. The measured average particle size of the polymer bead particles was 200 μm.

Manufacture of Injection-Molded Article and Extruded Sheet

Examples 7 to 12 and Comparative Examples 2 to 4

65.5 wt % of PC (3020PJ), 11.4 wt % of ABS (IM-601), 18 wt % of SAN (92HR), and 0.3 wt % of an antioxidant were mixed with 4.7 wt % of each of the polymer particles according to Examples 1 to 6 and Comparative Example 1, matting polymer composition pellets were obtained through an extruder, and then the pellets were dried, thereby preparing a specimen having a size of 70 mm in width×75 mm in length×3.0 mm in thickness through an injection machine and a sheet-like specimen having a size of 100 mm in width×75 mm in length×2.0 mm in thickness through a single sheet extruder. The physical properties of the produced injection-molded article and extruded sheet were measured. The results are shown in Table 1.

Comparative Example 5

The same procedure as that of Example 7 was performed, except that the same amount of SAN Gel-1 according to U.S. Patent Application Publication No. 5580924 was added instead of the polymer particles. The physical properties of the produced injection-molded article and extruded sheet were measured. The results are shown in Table 1.

TABLE 1

| | Used suspension polymer particles as a matting agent | Surface gloss 60° Injection-molded article | Surface gloss 60° Extruded sheet | 85° Extruded sheet | IZOD impact strength [J/m] ¼" | IZOD impact strength [J/m] ⅛" | Tensile strength [MPa] |
|---|---|---|---|---|---|---|---|
| Example 7 | Example 1 | 10.8 | 8.8 | 18.1 | 20.5 | 53.7 | 575 |
| Example 8 | Example 2 | 12.3 | 11.5 | 22.5 | 21.0 | 57.0 | 581 |
| Example 9 | Example 3 | 9.2 | 8.5 | 16.8 | 19.1 | 50.4 | 561 |
| Example 10 | Example 4 | 9.8 | 10.2 | 17.3 | 20.4 | 54.1 | 566 |
| Example 11 | Example 5 | 22.7 | 26.4 | 42.1 | 18.2 | 50.5 | 560 |
| Example 12 | Example 6 | 27.1 | 31.8 | 45.4 | 17.5 | 50.1 | 563 |
| Comparative Example 2 | Comparative Example 1 | 45.6 | 56.8 | 79.7 | 14.9 | 40.2 | 551 |
| Comparative Example 3 | BLENDEX BMAT | 11.4 | 34.9 | 48.6 | 15.6 | 47.1 | 567 |
| Comparative Example 4 | XPHERE-NGR | 28.5 | 56.5 | 78.1 | 18.5 | 42.2 | 569 |
| Comparative Example 5 | SAN Gel-1 | 18.2 | 51.7 | 71.2 | 20.9 | 51.2 | 589 |

BLENDEX BMAT: Styrene-acrylonitrile copolymer
XPHERE-NGR: Styrene-acrylonitrile copolymer As shown in Table 1, it was confirmed that in the case of the sheet (molded article) manufactured by extrusion or injection-molding processing of the matting polymer composition including the polymer particles of the present disclosure, the surface gloss was effectively reduced, and specifically, in the cases of each of Examples in which the polymer particles of the present disclosure were applied to PC/ABS, mechanical properties such as impact strength and tensile strength were not significantly changed, and a more excellent matting effect than in Comparative Examples 3 and 4 to which a commercially available product was applied.

In particular, from the results in which in all of Comparative Examples 2 to 5, the surface gloss at 85° was 45 or more, whereas in all of Examples 7 to 11, the surface gloss at 85° was 25 or less, it was confirmed that in the case where the matting agent (polymer particles) according to the present disclosure was used, the matting effect in the extrusion processing, which was difficult to be implemented in the related art, was significantly effectively exerted. In addition, the appearance of the sheet according to Example 7 in which the polymer particles with an appropriately controlled degree of crosslinking was excellent, whereas the appearance of the sheet of Comparative Example 5 was determined to be defective because the surface was significantly uneven and had a large number of black spots.

As a result of comparing Examples 11 and 12 using the polymer particles of Examples 5 and 6 with Example 7, it could be confirmed that in the case of the polymer particles produced using the polymerizable composition including 20 to 45 parts by weight of an unsaturated nitrile compound and 2.5 to 25 parts by weight of an alicyclic epoxy compound based on 100 parts by weight of an aromatic vinyl compound, a more excellent matting effect was exerted.

In addition, as a result of comparing Examples 7 to 9 using the polymer particles of Examples 1 to 3, it could be confirmed that in the case where the alicyclic epoxy compound and the acid compound were included at a weight ratio of 1:0.005 to 0.2, a more excellent matting effect was exerted.

As set forth above, the polymer particles according to the present disclosure may be produced by a simple process using a suspension polymerization method, and be relatively easy to control a degree of crosslinking. In addition, in a case where a matting polymer composition is prepared using a matting agent including the polymer particles, matting properties may be effectively exhibited without deterioration of other physical properties.

Further, in the case of the matting polymer composition, it is possible to manufacture a molded article having excellent appearance and matting effect without deterioration of the existing mechanical properties such as impact strength and tensile strength of a thermoplastic polymer, and in particular, an excellent matting effect may be exerted even in the extrusion processing, which has been difficult to achieve in the related art.

The matting agent of the present disclosure and the matting polymer composition including the same may be applied to various products such as vehicle interior/exterior materials, interior materials, and home appliances.

Hereinabove, although the present disclosure has been described by specific matters, limited exemplary embodiments, and drawings, they have been provided only for assisting in the entire understanding of the present disclosure. Therefore, the present disclosure is not limited to the exemplary embodiments. Various modifications and changes may be made by those skilled in the art to which the present disclosure pertains from this description.

Therefore, the spirit of the present disclosure should not be limited to the described exemplary embodiments, but the claims and all modifications equal or equivalent to the claims are intended to fall within the spirit of the present disclosure.

The invention claimed is:

1. A matting agent comprising polymer particles,
wherein the polymer particles are produced using a polymerizable composition including an aromatic vinyl compound, an unsaturated nitrile compound, and an alicyclic epoxy compound, and
an average particle size of the polymer particles is 1 to 5,000 µm,
wherein the polymer particles include divalent-SO3-.

2. The matting agent of claim 1,
wherein the polymer particles are produced by suspension polymerization.

3. The matting agent of claim 1,
wherein the alicyclic epoxy compound has two or more epoxy groups.

4. The matting agent of claim 1,
wherein the alicyclic epoxy compound is one or more selected from the group consisting of 3,4-epoxycyclohexylmethyl 3,4-epoxycyclohexane-carboxylate, diethylene glycol bis(3,4-epoxycyclohexane-carboxylate), 2-ethyl-1,3-hexanediol bis(3,4-epoxycyclohexane-carboxylate), diethylene glycol bis(3,4-epoxy-6-methylcyclohexane-carboxylate), 3-methyl-1,5-pentanediol bis(3,4-epoxycyclohexane-carboxylate), 1,5-pentanediol bis(3,4-epoxycyclohexane-carboxylate), ethylene glycol bis(3,4-epoxycyclohexane-carboxylate), ethylene glycol bis (3,4-epoxy-6-methylcyclohexane-carboxylate), bis(3,4-epoxycyclohexylmethyl) oxalate, bis(3,4-epoxycyclohexylmethyl) succinate, bis(3,4-epoxycyclohexylmethyl) adipate, and 1,2,8,9-diepoxylimonene.

5. The matting agent of claim 1,
wherein the polymerizable composition includes the unsaturated nitrile compound and the alicyclic epoxy compound in amounts of 20 to 45 parts by weight and 2.5 to 25 parts by weight, respectively, based on 100 parts by weight of the aromatic vinyl compound.

6. The matting agent of claim 1,
wherein the polymerizable composition further includes one or two or more compounds selected from the group consisting of $R_1COOH$, $R_2SO_3H$, and salt compounds thereof, and
$R_1$ and $R_2$ are independently $C_{6-30}$ alkyl, $C_{6-30}$ aryl, or $C_{6-30}$ alkyl $C_{6-30}$ aryl.

7. The matting agent of claim 6,
wherein the polymerizable composition includes the one or two or more compounds in an amount of 0.05 to 1 part by weight based on 100 parts by weight of the aromatic vinyl compound.

8. A matting polymer composition comprising the matting agent of claim 1 and a thermoplastic polymer.

9. The matting polymer composition of claim 8, wherein the thermoplastic polymer is one or more selected from the group consisting of polypropylene (PP), polyacrylate, polyethylene terephthalate (PET), polybutylene terephthalate (PBT), polymethyl methacrylate (PMMA), polycarbonate (PC), polyamide, a styrene-acrylonitrile (SAN) copolymer, acrylonitrile-butadiene-styrene (ABS), acrylonitrile-styrene-acrylate (ASA), and a mixture thereof.

* * * * *